US006069339A

United States Patent [19]

McGrath et al.

[11] Patent Number: 6,069,339

[45] Date of Patent: May 30, 2000

[54] DUAL FLOW NOZZLE SHIELD FOR PLASMA-ARC TORCH

[75] Inventors: David M. McGrath, Canaan; Terry L. Dion, Enfield, both of N.H.

[73] Assignee: Consumable Plasma Products, Inc., Grafton, N.H.

[21] Appl. No.: 09/418,934

[22] Filed: Oct. 15, 1999

[51] Int. Cl.[7] .................. B23K 10/00

[52] U.S. Cl. .................. 219/121.44; 219/121.51; 219/121.5; 219/75; 313/231.31

[58] Field of Search .................. 219/121.5, 121.51, 219/121.48, 75, 121.44, 121.36, 121.52, 74; 313/231.31, 231.41

[56] References Cited

U.S. PATENT DOCUMENTS 5,147,998 9/1992 Tsantrizos et al. .................. 219/121.5
5,235,155 8/1993 Yamada et al. .................. 219/121.39
5,396,043 3/1995 Couch, Jr. et al. .................. 219/121.5

*Primary Examiner*—Mark Paschall
*Attorney, Agent, or Firm*—Pearson & Pearson

[57] ABSTRACT

A dual flow nozzle shield of a plasma-arc torch positioned in front of a torch end cap and secured in such position by a shield retaining cap. The shield is made from lava or wonderstone ceramics or copper materials. The shield has three support feet for resting on a counterbore section of one end of the cylindrical torch end cap and for providing space between the shield and the shield retaining cap for gas bypass around the outside of the shield. An alternate embodiment of the nozzle shield comprises a plurality of notches around the perimeter of the shield for the bypass gas to pass through. A primary gas enters the shield with a portion of the primary gas going through an orifice in the center of the shield. Both embodiments have a backflow or bypass portion of the primary gas that does not go through the orifice, but instead goes back up and through the space between the posts in one embodiment or the notches in the second embodiment and comes down over the outer side of the shield. This bypass gas is directed toward the arc, keeps splattering molten metal directed toward the arc, and keeps the splattering molten metal away from the front of the shield resulting in a better quality of cut, longer life of the shield and less cost for shield replacement.

15 Claims, 9 Drawing Sheets

DUAL FLOW NOZZLE SHIELD FOR PLASMA-ARC TORCH

BACKGROUND OF THE INVENTION

1. Field of the Invention

This invention relates generally to plasma torches for cutting and welding, and in particular, to a dual flow nozzle shield which permits primary gas to pass both through an orifice in the center of the nozzle shield and a portion of the gas flow back up and over the outside of the shield via a plurality of spaces around the shield perimeter, the bypass gas flow being directed toward an arc to block splattering molten metal.

2. Description of Related Art

The basic elements or typical plasma-arc torch comprises a torch barrel, an electrode mounted within the body, a nozzle with a center orifice that produces a pilot arc to the electrode to initiate a plasma-arc in a flow of a suitable gas, tubes extending from the rear of the barrel for receiving gas line passages in the torch for cooling, and a ceramic insert mounted at the face of the torch immediately adjacent to a workpiece.

During the piercing and cutting operation molten metals are inclined to fly upward toward the nozzle or shield in front of a nozzle which degrades the function of these components and cutting operation. Several approaches in the prior art have been tried to keep splattering molten metals from flying into the shield of nozzle.

In U.S. Pat. No. 4,861,962, issued Aug. 29, 1989 to Sanders et al. and assigned to Hypertherm, Inc., a nozzle shield is described for a plasma-arc torch operating in the 0–200 ampere range having a shield mounted at its lower end adjacent to a workpiece to block splattered molten metal from reaching a nozzle of the torch. The shield is electrically insulated by mounting it on an insulating ring. A secondary gas flow through the torch passes through the space between the nozzle and the shield to provide cooling. A first portion of the secondary gas flow exits through at least one bleed port and a second portion exits through said shield exit orifice and is of a velocity to stabilize the plasma produced by primary gas flow exiting the torch of the nozzle orifice 18 and the shield exit orifice.

In U.S. Pat. No. 5,120,930, issued Jun. 9, 1992 to Sanders et al. and assigned to Hypertherm, Inc., a plasma-arc torch is described with improved nozzle shield and step flow. This patent is a continuation-in-part of U.S. Pat. No. 4,861,962 (described above) but further claims that the secondary gas flow means includes at least one opening in the shield in fluid communication with the space between the nozzle and the shield and located before the exit orifice to bleed off a first portion of the secondary gas flow, at least one opening being angled from the vertical at an angle greater than zero degrees. A second portion of the secondary gas flow exits through the shield exit orifice and being of a velocity to stabilize the plasma produced by the primary gas flow exiting the torch of the nozzle orifice and the shield exit orifice.

In U.S. Pat. No. 5,132,512, issued Jul. 21, 1992 to Sanders et al. and assigned to Hypertherm, Inc., an arc torch nozzle shield mounted on a torch body is described, the shield generally surrounding the nozzle in a spaced relationship and having an exit orifice aligned with the nozzle orifice, means for insulating the shield electrically from the body to prevent double arcing and means for producing secondary gas flow through the body, the secondary gas flow passing through the space between the nozzle and the shield at a rate sufficient to cool the shield, the secondary gas flow means including at least one opening in the shield in fluid communication with the space and located before the exit orifice to bleed off a portion of the secondary gas flow, and at least one opening being angled from the vertical at an angle greater than zero degrees.

In U.S. Pat. No. 5,591,357, issued Jan. 7, 1997 to Couch, Jr. et al. and assigned to Hypertherm, Inc., a plasma-arc torch having a secondary gas flow is described that is extremely large during piercing of a workpiece to keep splattered molten metal away from the torch and thereby prevent double arcing. A nozzle is mounted immediately below an electrode in a spaced relationship to define a plasma-arc chamber therebetween where plasma gas fed from a swirl ring is ionized to form either a pilot arc or plasma jet between the electrode and a workpiece. The secondary flow path including the orifice, prechamber and the swirl ring are the principal features of this invention. The swirl ring contains a set of off-center, or canted holes which introduce a swirling movement to the flow which facilitates the interaction of the secondary gas stream with the jet. The claims are directed to a method of operating a plasma-arc cutting system comprising the steps of directing a plasma gas flow to a plasma chamber, forming a secondary gas flow as a mixture of non-oxidizing gas and at least 40% of oxidizing gas, directing the secondary gas flow from an inlet to a flow path, altering the secondary gas flow, in the secondary gas flow path, and directing the secondary gas flow from a secondary gas flow path through secondary gas flow exit orifice and onto the plasma-arc as the plasma-arc passes through file nozzle exit orifice.

In U.S. Pat. No. 5,614,110, issued on Mar. 25, 1997 to Shintani et al. and assigned to Komatso, Ltd., of Tokyo, Japan, a method and apparatus for varying protective gas composition between piercing and cutting with a plasma torch is described so that it is possible to protect a nozzle by only a small amount of dross being blown upward. The plasma torch comprises an electrode, a nozzle having an orifice, a plasma gas passage, a protective cap having an opening in alignment with the orifice and a protective gas passageway. A piercing completion detection unit detects an electronic current between an electrode and a workpiece at the time of piercing and outputs a signal at the time of the completion of the piercing. A flow regulator is provided in a protective gas circuit which switches, in response to the piercing completion signal, the flow rate of the protective gas from a high flow rate at the time of piercing to a low flow rate at the time of cutting. An expensive gas such as hydrogen or argon can be used as a protective gas for obtaining a good cut surface quality. A low-price protective gas can be used at the time of piercing.

SUMMARY OF THE INVENTION

Accordingly, it is therefore an object of this invention to provide a nozzle shield in a plasma-arc torch that enables a primary gas flow through an orifice in the front of the shield along with a first portion of a secondary gas flow while a second portion of the secondary gas flow flows back over the outside of the shield.

It is another object of this invention to provide a bypass gas flow over the outer side of a nozzle shield which is directed toward the arc to keep splattering molten metal away from the front of the shield.

It is another object of this invention to provide a bypass gas flow over the outer side of the shield in order to remove heat from the nozzle and electrode.

It is yet another object of this invention to provide a shield made of copper or ceramic.

It is another object of this invention to provide for secondary gas swirling around the outside of the electrode and inside the nozzle shield to pull heat from the nozzle and electrode exiting some gas through the nozzle shield orifice.

These and other objects are accomplished in a plasma-arc torch having a body, an electrode mounted in the body, a swirl ring positioned around the electrode, a nozzle with an orifice mounted over the end of the electrode and around the swirl ring, means for providing a gas flow through the body and exiting through the nozzle orifice and means for directing an electrical current between the electrode and the nozzle to produce a plasma-arc exiting the torch through the nozzle orifice to pierce and then cut a metal workpiece, the improvement comprising a torch end cap having a first end mounted to the torch body and a second end surrounding the nozzle, the second end of the torch end cap comprises a circular counterbore adjacent to the side wall of the nozzle, a shield generally surrounding the portion of the nozzle extending from the torch end cap, the shield being disposed on the circular counterbore of the torch end cap, a shield retaining cap mounted to the torch end cap for securing the shield and the nozzle to the torch end cap, and means for providing a bypass gas flow, the bypass gas flow formed from a portion of the primary gas flow, to flow back up over the outside of the nozzle shield and the inside of the shield retaining cap, the bypass gas flow exiting from the torch at an angle directed to the plasma-arc. The means for providing a bypass gas flow comprises areas of space at the end of the shield adjacent to the counterbore of the torch end cap. The shield comprises at least three support feet spaced equidistant from each other and the areas of space being disposed between the support feet. The shield comprises a plurality of notches around the perimeter of a larger diameter end of the nozzle shield.

The objects are further accomplished by a shield for a plasma-arc torch that pierces and cuts a metallic workpiece producing a splattering of molten metal directed at the torch, the shield protecting a nozzle having a central orifice through which a plasma jet exits toward the workpiece, the shield comprising a generally conical sidewall having a truncated end wall generally transverse to the plasma jet exiting the nozzle, an exit orifice formed in the truncated end wall generally aligned with the nozzle central orifice, the exit orifice being sufficiently small wherein splattered molten metal strikes the shield without reaching the nozzle, means around a perimeter of an open end of the shield for providing a plurality of paths for a bypass gas to flow back up over the outside wall of the shield, means for securing the shield to the torch wherein the end wall and the side wall of the shield being in a spaced relationship with the nozzle to define therebetween a flow path for cooling gas flow, and a sidewall of the securing means being in a spaced relationship with the sidewall of the nozzle to define therebetween a flow path directed at the plasma-arc whereby molten metal is directed away from the shield. The means for providing a plurality of paths for a bypass gas flow comprises a plurality of notches around the shield perimeter. Also, the means for providing a plurality of paths for a bypass gas flow comprises at least three support feet spaced equidistant from each other to provide areas of space between the support feet. The shield securing means comprises a torch end cap.

The objects are further accomplished in a method of piercing and cutting a workpiece with a plasma-arc from a torch that produces a plasma of ionized gas between an electrode mounting within the torch and a nozzle mounted at one end of the torch adjacent the workpiece, the improvement comprising the steps of surrounding the nozzle with a second end of a torch end cap having a first end mounted to the torch body, providing a circular counterbore on the second end of the torch end cap adjacent to a side wall of the nozzle, surrounding the portion of the nozzle extending from the torch end cap with a shield, the shield being disposed on the circular counterbore of the torch end cap, securing the shield and the nozzle to the torch end cap with a shield retaining cap, providing a bypass gas flow, the bypass gas flow formed from a portion of the primary gas flow to flow back up over the outside of the nozzle shield and the inside of the shield retaining cap, and directing the bypass gas flow exiting from the torch at an angle aimed at the plasma-arc. The step of providing a bypass gas flow comprises the step of providing areas of space at the end of the shield adjacent to the counterbore of the torch end cap. The step of surrounding the portion of the nozzle extending from the torch end cap with a shield comprises the step of providing the shield with at least three support feet spaced equidistant from each other, the areas of space being disposed between the support feet. Also, the step of surrounding the portion of the nozzle extending from the torch end cap with a shield comprises the step of providing the shield with a plurality of notches around the perimeter of a larger diameter end of the nozzle shield.

The objects are further accomplished by a method of providing a shield for a plasma-arc torch that pierces and cuts a metallic workpiece producing a splattering of molten metal directed at the torch, the shield protecting a nozzle having a central orifice through which a plasma jet exits toward the workpiece, comprising the steps of providing a generally conical sidewall having a truncated end wall generally transverse to the plasma jet exiting the nozzle, providing an exit orifice in the truncated end wall for aligning with the nozzle central orifice, the exit orifice being sufficiently small whereby the splattering of molten metal strikes the shield without reaching the nozzle, and providing a plurality of paths for a bypass gas to flow back up over the outside wall of the shield with means around a perimeter of an open end of the shield. The step of providing a plurality of paths for a bypass gas to flow back up over the outside wall of the shield comprises the step of providing a plurality of notches around the shield perimeter. Also, the step of providing a plurality of paths for a bypass gas to flow back up over the outside wall of the shield comprises the step of providing at least three support feet spaced equidistant from each other to provide areas of space between the support feet.

Additional objects, features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
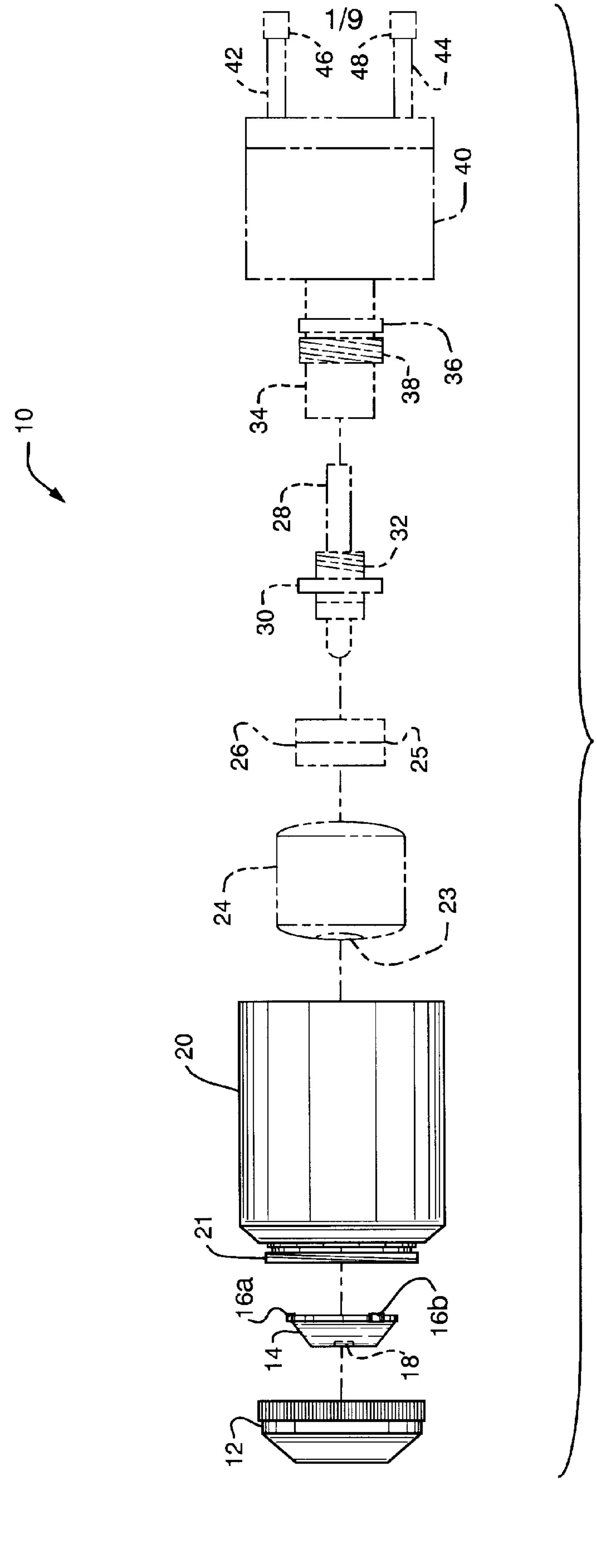
FIG. 1 is an exploded perspective view of a plasma-arc torch according to the present invention.
Figure 3:
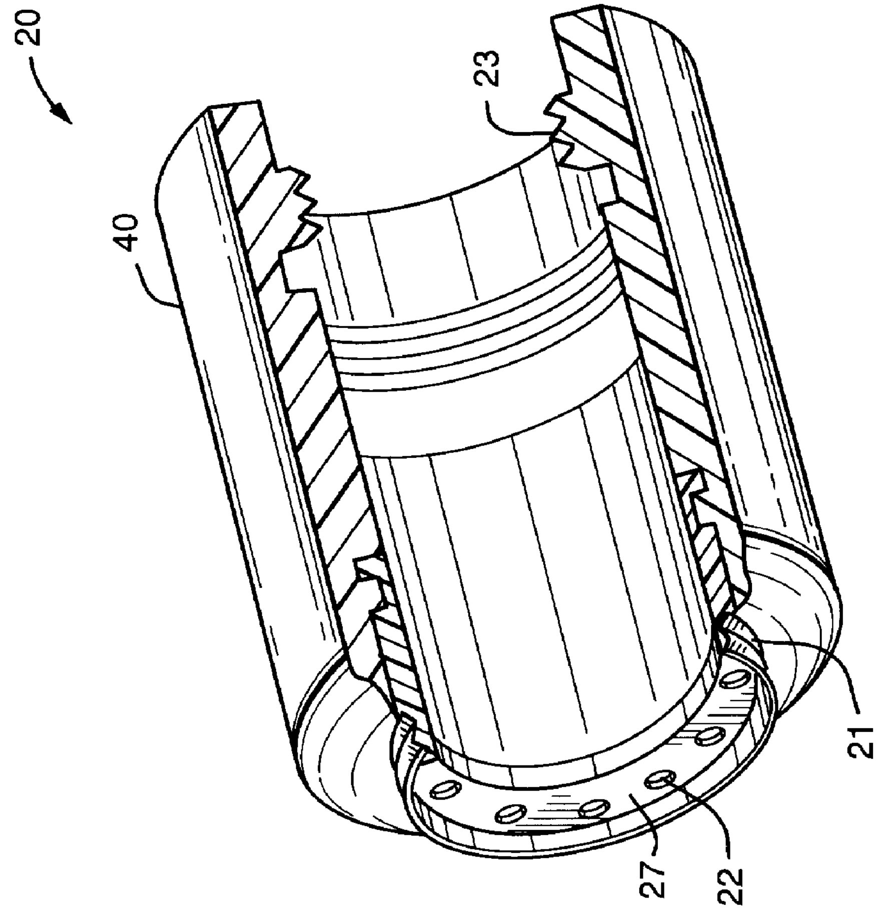
FIG. 3 is a view in perspective, with portions broken away, of the plasma-arc torch end cap as shown in FIG. 1.

Referring now to FIG. 1 and FIG. 3, FIG. 1 shows an exploded perspective view of a plasma-arc torch 10 comprising the invention of a dual flow nozzle shield 14 and FIG. 3 is a perspective view of a torch end cap 20 with side wall portion broken away. The torch end cap 20 comprises an outside thread 21 on a first end and an inside thread 23 disposed within a second end. The torch 10 further comprises the nozzle shield 14 which is positioned on an inner counterbore ledge 27 as shown in FIG. 3, and a shield retaining cap 12 with inside threads (not shown) for screwing onto the outside threads 21 of end cap 20 and securing the nozzle shield 14 within a first or front end of the torch end cap 20.

The torch 10 also comprises a torch barrel 34 having an electrode 28, with a stop ring 30 extending radially outward from the perimeter of the electrode 28, screwed into a first end of the barrel 34 and two tubes 42, 44 extending from a second end with threaded connectors 46, 48 attached to the tubes 42, 44 respectively for receiving a primary gas in tube 42 and a secondary gas in tube 44.

Still referring to FIG. 1, a swirl ring 26 is positioned over the outside of the portion of the electrode 28 extending out of the first end of the barrel 34, and an outer ring 25 approximately at the center of the length of the swirl ring 26 is positioned adjacent to the first end of the barrel 34. A nozzle 24 is placed over the front portion of the swirl ring 26, and the nozzle 24, electrode 28 and barrel 34 combination is inserted into the second end of the end cap 20. The threads 23 inside the end cap 20 screw into the threads 38 around the torch barrel 34. One of ordinary skill in the art of plasma-arc torches will recognize that there are many sizes, variations and manufacturers of plasma-arc torches, and that various size nozzle shields 14 may be implemented to match the size of the nozzle 24, end cap 20, and shield retaining cap 12.

Figure 2:
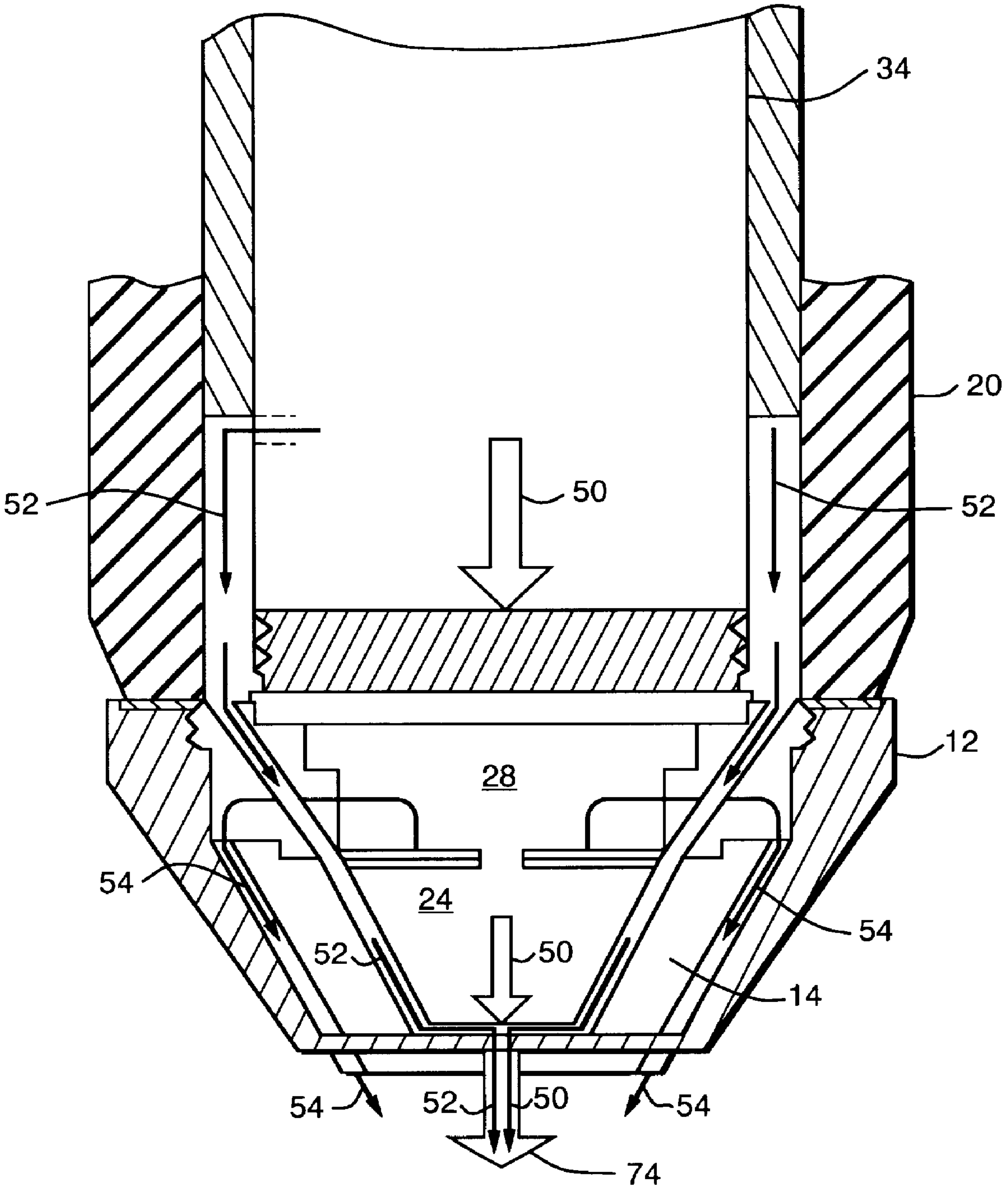
FIG. 2 is a simplified view in vertical cross-section of a plasma-arc torch incorporating the dual flow nozzle shield according to the invention.

Referring now to FIG. 2, a simplified view in vertical cross-section of a plasma-arc torch 10 is shown which includes the nozzle shield 14. This Figure shows the primary gas flow 50, the secondary gas flow 52, and the bypass gas 54 around the outside of the nozzle shield 14. The primary gas flow 50 proceeds down the barrel 34 around the electrode 28 through the nozzle 24 and nozzle shield 14 and exits the orifice 18 in the nozzle shield 14. Secondary gas flow 52 proceeds around the nozzle 24 merging with the primary gas flow 50, and both exit the nozzle 24 via the orifice 18 in the nozzle shield 14.

The bypass gas 54 is forced back out of the nozzle shield 14 around the outside of the nozzle shield 14 and exits the torch 10 at an angle directed toward the arc in order to keep splattering molten metal directed toward the plasma-arc 74 and away from the front of the shield 14.

Figure 9:
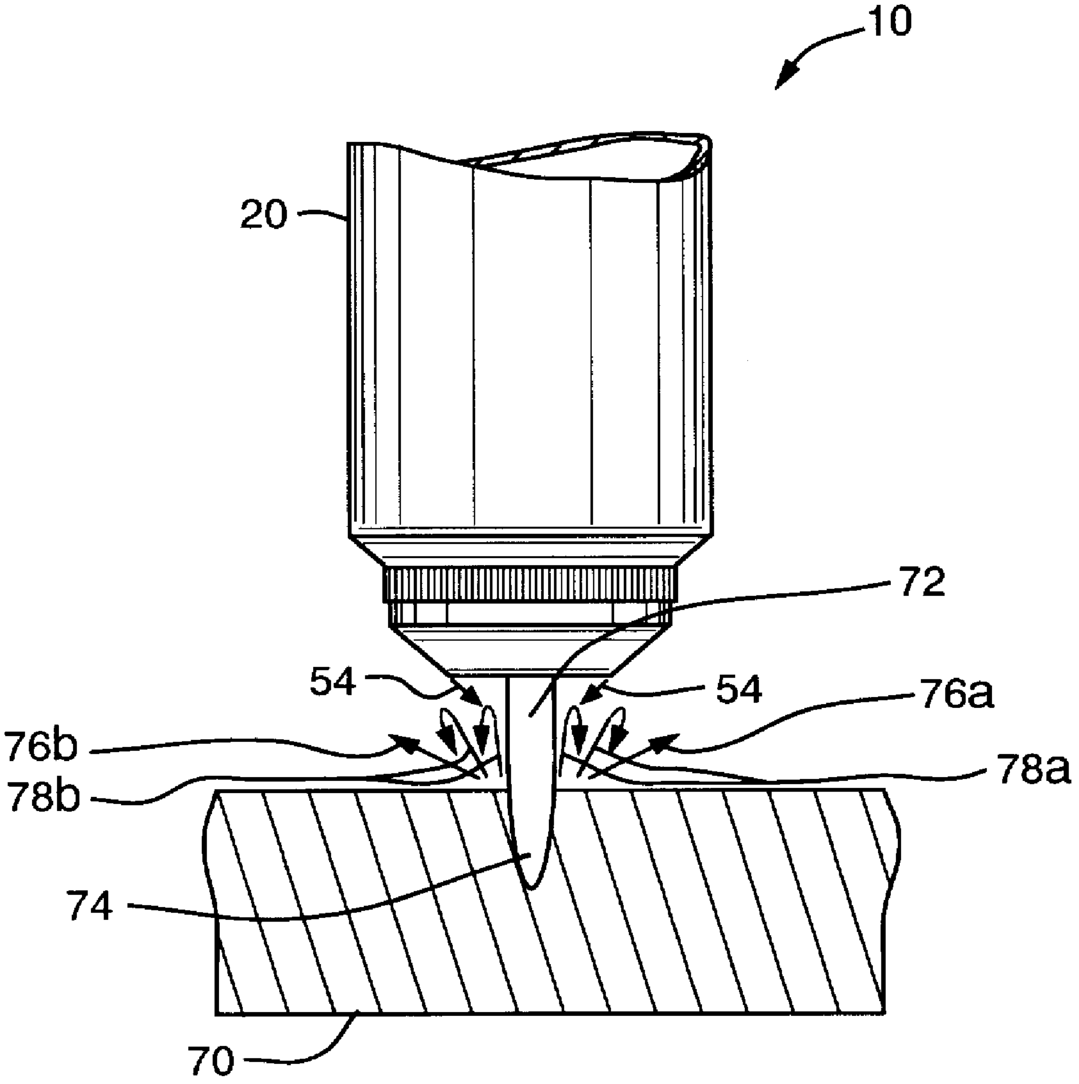
FIG. 9 is a simplified view in side elevation and partially in section showing the plasma-arc torch of FIG. 1 piercing a workpiece.

Referring to FIG. 1, FIG. 2 and FIG. 9, FIG. 9 shows the plasma-arc torch 10 having a plasma-arc 74 piercing a workpiece 70. A plasma-arc 74 is generally formed by a high frequency voltage applied via tube 46 to the electrode 28 and a pilot arc occurs between the electrode and the nozzle 24 (anode). Plasma gas fed from the swirl ring 26 is ionized to form either the pilot arc between the electrode 28 and the nozzle 24 or a transferred arc or plasma-arc 74 between the electrode 28 and a workpiece 70.

Referring now to FIG. 3, a perspective view of the torch end cap 20 with portions broken away is shown. Threads 23 mate with the threads 38 around the torch barrel 34. Gas holes 22 are positioned equidistant from each other around an inner cylindrical counterbore ledge 27. Threads 21 are provided on the outside of the first end of the end cap 20. The inside of the end cap 20 is copper and the outside has a covering of a common insulating material 40.

Figure 4:
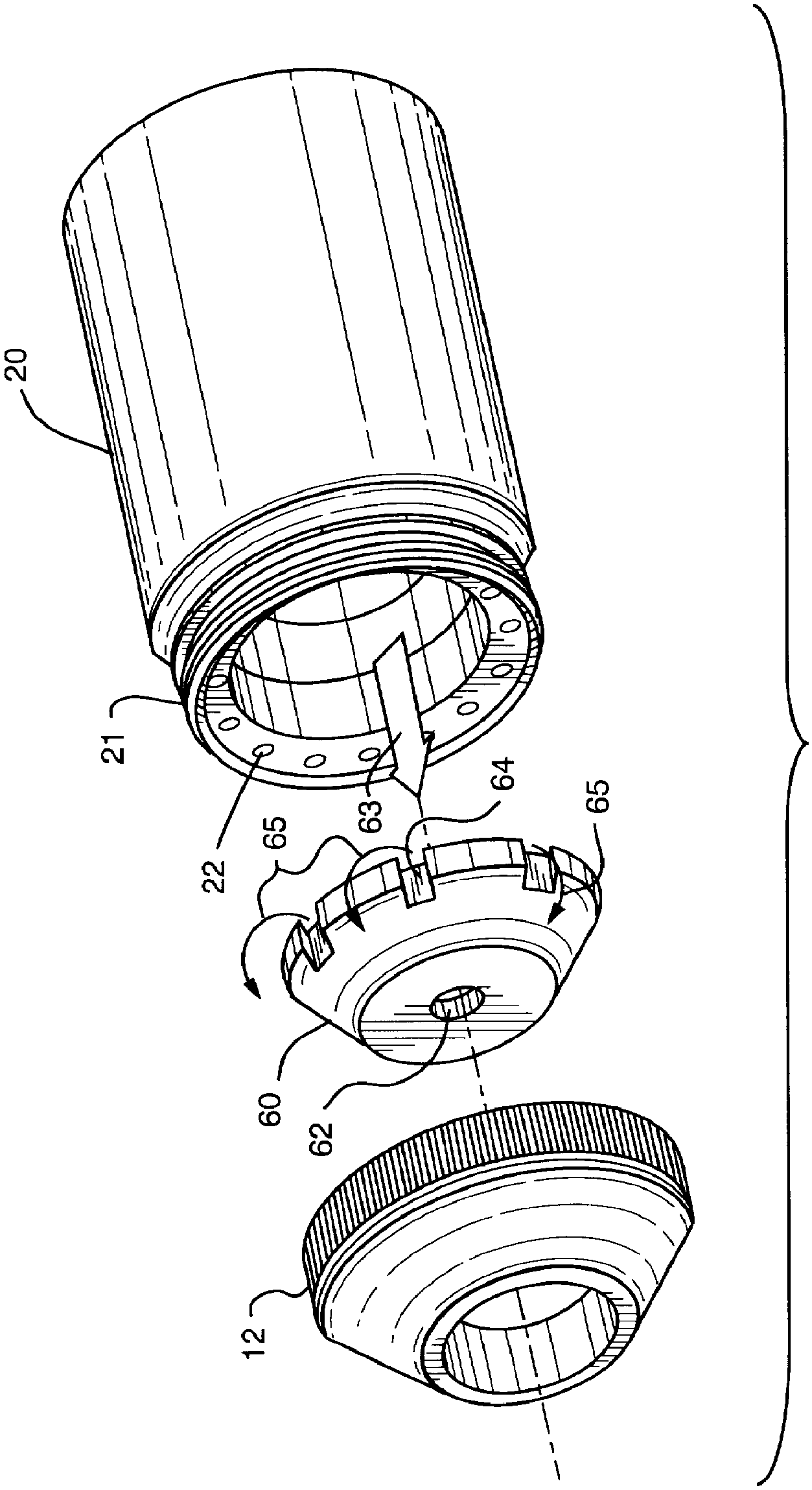
FIG. 4 is an exploded perspective view of the lower portion of a plasma-arc torch showing an alternate embodiment of a dual flow nozzle shield having a plurality of notches around the perimeter.

Referring now to FIG. 4, an exploded perspective of the lower portion of a plasma-arc torch 10 is shown comprising an alternate embodiment of dual flow nozzle 60. The alternate embodiment nozzle shield 60 is disposed between the first end of the end cap 20 and the shield retaining cap 12. Bypass gas 65 flows through a plurality of notches 64 around the perimeter of the wider end of the nozzle shield 60. The nozzle shield 60 may be made from ceramics or copper materials.

Figure 5C:
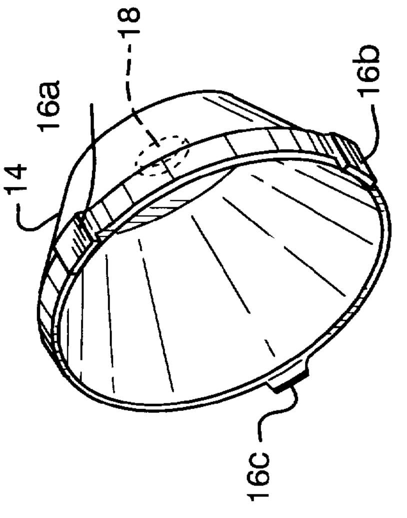
FIG. 5C is a rear perspective view of the preferred embodiment of the dual flow nozzle shield.
Figure 5B:
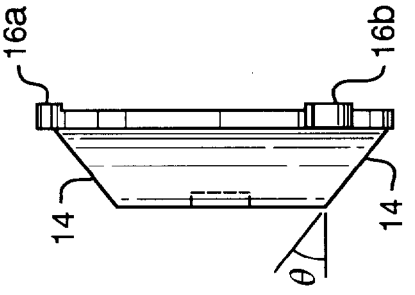
FIG. 5B is a side elevational view of the preferred embodiment of the dual flow nozzle shield.
Figure 5A:
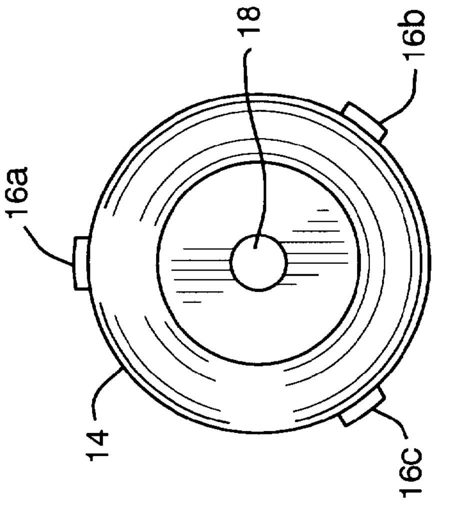
FIG. 5A is a front elevational view of a preferred embodiment of the dual flow nozzle shield.

Referring to FIGS. 5A, 5B and 5C, FIG. 5A is a front elevational view of the dual flow nozzle shield 14, FIG. 5B is a side elevational view of the shield 14 and FIG. 5C is a rear perspective view of the shield 14. The nozzle shield 14 comprises an orifice 18 in the center of the front truncated surface of the conical structure through which primary gas flow 50 exits as shown in FIG. 2. The nozzle shield 14 comprises three support feet 16*a*, 16*b* and 16*c* spaced equidistant or 120 degrees around the wider end base of the shield 14. The three support feet 16*a*, 16*b*, 16*c* provide three areas 17*a*, 17*b*, 17*c* of space around the base of the shield 14 when the shield 14 is positioned on the torch end cap 20 and secured by retaining cap 12 as shown in FIG. 1, enabling bypass gas flow 54 to occur from inside the shield 14 back out through the three space areas and along the outside of the nozzle shield 14. The nozzle shield 14 may be made from lava or wonderstone ceramic, or copper materials. In one embodiment of the nozzle shield 14 the diameter of the wider base is 0.948 inches, the diameter of the truncated front surface is 0.56 inches and the diameter of the orifice 18 is 0.12 inches. The angle θ shown in FIG. 5B between the horizontal and the conical side is approximately 37.5 degrees. The total depth of the conical side is approximately 0.31 inches.

Figure 6:
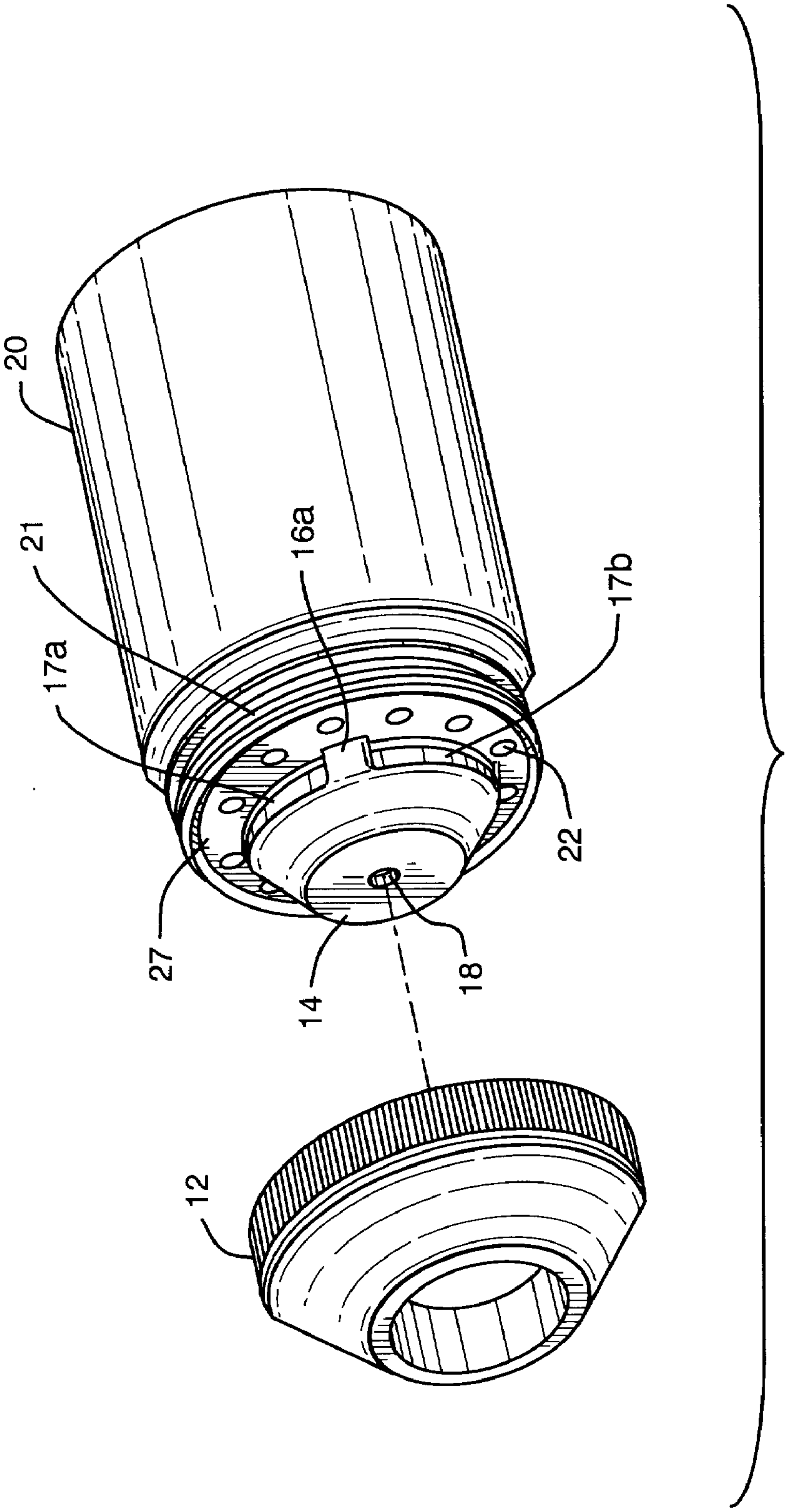
FIG. 6 is a partial exploded perspective view of a torch end cap showing a counter-bore around the top for centering the nozzle shield.

Referring now to FIG. 6, a partial exploded perspective view of the torch end cap 20 is shown with the nozzle shield 14 disposed on the inner counterbore ledge 27 of the first end of the torch end cap 20 with the shield retaining cap 12 extended away therefrom. The three areas 17*a*, 17*b* and 17*c* of space around the base of the shield 14 provide for the bypass gas flow 54 to occur from inside the shield 14 back up through such space areas 17*a*, 17*b* and 17*c*.

Figure 7C:
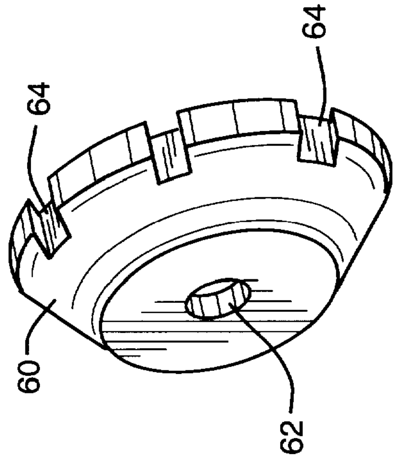
FIG. 7C is a front perspective view of the alternate embodiment of the dual flow nozzle shield.
Figure 7B:
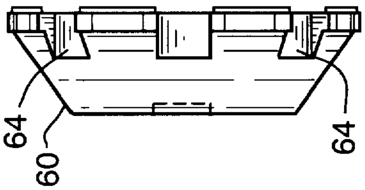
FIG. 7B is a side elevational view of the alternate embodiment of the dual flow nozzle shield.
Figure 7A:
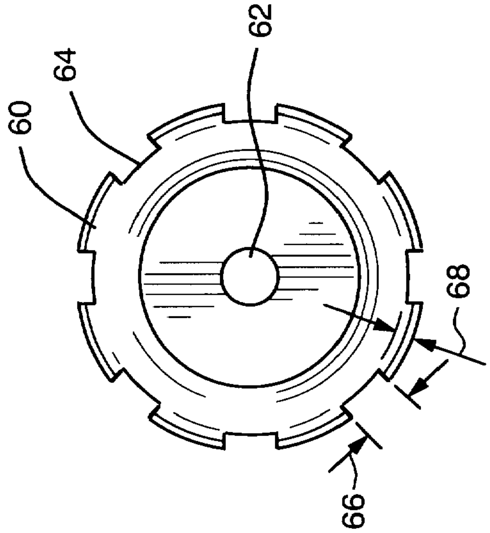
FIG. 7A is a front elevational view of an alternate embodiment of the dual flow nozzle shield.

Referring now to FIG. 7A, FIG. 7B and FIG. 7C, FIG. 7A is a front elevational view of the alternate embodiment of the nozzle shield 60, FIG. 7B is a side elevational view of the same nozzle shield 60 and FIG. 7C is a rear perspective view also shown in FIG. 4. A plurality of cutouts or notches 64 are positioned around the circumference of the base of the nozzle shield 60 and the notches 64 are equidistance from each other or 120 degrees apart. The embodiment shown has 8 equidistant placed notches 64 but other numbers of notches 64 may be employed depending on the size of the torch 10 and the space available around the circumference of the nozzle shield 60. The nozzle shield 60 is made from lava or wonderstone ceramic or copper materials and has overall dimensions similar to the nozzle shield 14 in FIGS. 5A, 5B and 5C for a similar size torch 10. The notches 64 shown in FIG. 7A are approximately 0.12 inches wide 66 and 0.19 inches deep 68.

Figure 8:
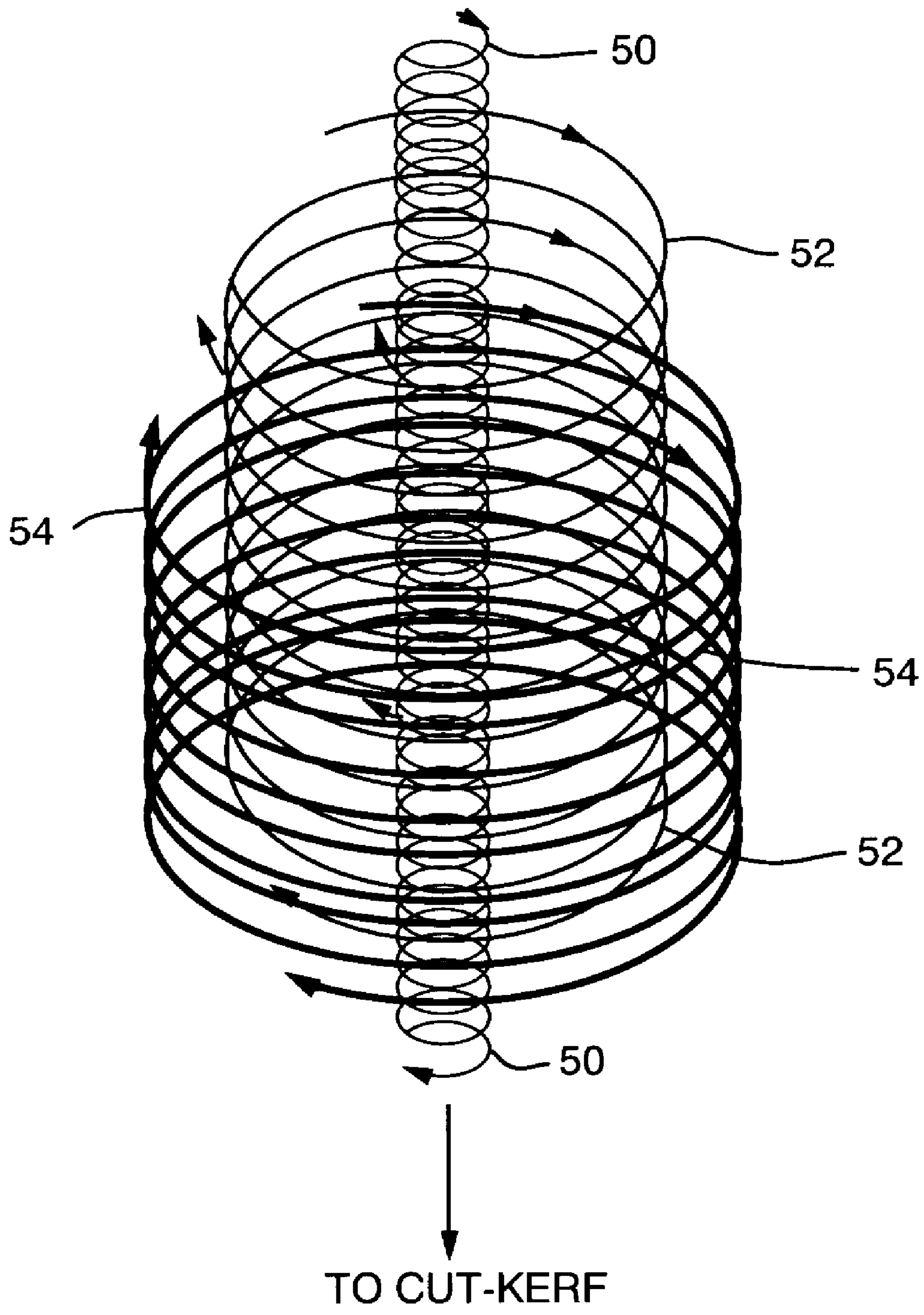
FIG. 8 is an illustration of the primary gas flow, secondary gas flow and bypass gas swirling within a nozzle shield and exiting a nozzle shield.

Referring now to FIG. 8, an illustration of the primary gas flow 50 and secondary gas flow 52 is shown along with the bypass gas 54. The primary gas 50 swirls around the outside of the electrode 28 and inside of the nozzle 24 exiting through an orifice 23 in the nozzle 24. The secondary gas 52 swirls around the nozzle 24 and inside the nozzle shield 14 pulling heat from the nozzle 28 and electrode 28 exiting some gas through the nozzle shield orifice 18. Bypass gas 54 swirls out of the back of the nozzle shield 14 and flows along the outside of the nozzle shield 14 and inside the shield retaining cap 12 removing more heat and exiting inward toward the cut-KERF.

Referring now to FIG. 9, a simplified view in side elevation and partially in section is shown of the plasma-arc torch 10 piercing a workpiece 70. As the plasma-arc 72 heats the workpiece 70, the metal melts and the molten metal 76*a*, 76*b*, 78*a*, 78*b* flies out of the crater being formed at relative high speeds. When the crater is shallow, the molten metal 76*a*, 76*b* is inclined to be ejected wide of the shield retaining cap 12 in front of the shield 14. When the crater becomes deeper, the molten metal 78*a*, 78*b* is ejected increasingly in the direction of the shield 14. However, the bypass gas 54 flowing out of the end of the torch 10 between the shield retaining cap 12 and the nozzle shield 14 directs the molten metal 78*a*, 78*b* back toward the arc 72 and keeps the splattering molten metal 78*a*, 78*b* away from the front of the shield 14. This action of the bypass gas 54 flow results in a better quality of cut, longer life of the shield 14 and less cost for shield replacements.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. In a plasma-arc torch having a body, an electrode mounted in said body, a swirl ring positioned around said electrode, a nozzle with an orifice mounted over the end of said electrode and around said swirl ring, means for providing a gas flow through the body and exiting through the nozzle orifice and means for directing an electrical current between said electrode and said nozzle to produce a plasma-arc exiting the torch through the nozzle orifice to pierce and then cut a metal workpiece, the improvement comprising:

a torch end cap having a first end mounted to said torch body and a second end surrounding said nozzle;

said second end of said torch end cap comprises a circular counterbore adjacent to the side wall of said nozzle;

a shield generally surrounding said portion of said nozzle extending from said torch end cap, said shield being disposed on said circular counterbore of said torch end cap;

a shield retaining cap mounted to said torch end cap for securing said shield and said nozzle to said torch end cap; and means for providing a bypass gas flow, said bypass gas flow formed from a portion of said primary gas flow, to flow back up over the outside of said nozzle shield and the inside of said shield retaining cap, said bypass gas flow exiting from said torch at an angle directed to said plasma-arc.

2. The plasma-arc torch as recited in claim 1 wherein said means for providing a bypass gas flow comprises areas of space at the end of said shield adjacent to said counterbore of said torch end cap.

3. The plasma-arc torch as recited in claim 2 wherein said shield comprises at least three support feet spaced equidistant from each other and said areas of space being disposed between said support feet.

4. The plasma-arch torch as recited in claim 2 wherein said shield comprises a plurality of notches around the perimeter of a larger diameter end of said nozzle shield.

5. A shield for a plasma-arc torch that pierces and cuts a metallic workpiece producing a splattering of molten metal directed at the torch, said shield protecting a nozzle having a central orifice through which a plasma jet exits toward said workpiece, the shield comprising:

a generally conical sidewall having a truncated end wall generally transverse to said plasma jet exiting said nozzle;

an exit orifice formed in said truncated end wall generally aligned with said nozzle central orifice, said exit orifice being sufficiently small wherein splattered molten metal strikes said shield without reaching said nozzle;

means around a perimeter of an open end of said shield for providing a plurality of paths for a bypass gas to flow back up over said outside wall of said shield;

means for securing said shield to said torch wherein said end wall and said side wall of said shield being in a spaced relationship with said nozzle to define therebetween a flow path for cooling gas flow; and a sidewall of said securing means being in a spaced relationship with said sidewall of said nozzle to define therebetween a flow path directed at said plasma-arc whereby molten metal is directed away from said shield.

6. The shield as recited in claim 5 wherein said means for providing a plurality of paths for a bypass gas flow comprises a plurality of notches around said shield perimeter.

7. The shield as recited in claim 5 wherein said means for providing a plurality of paths for a bypass gas flow comprises at least three support feet spaced equidistant from each other to provide areas of space between said support feet.

8. The shield as recited in claim 5 wherein said shield securing means comprises a torch end cap.

9. In a method of piercing and cutting a workpiece with a plasma-arc from a torch that produces a plasma of ionized gas between an electrode mounting within the torch and a nozzle mounted at one end of the torch adjacent the workpiece, the improvement comprising the steps of:

surrounding said nozzle with a second end of a torch end cap having a first end mounted to said torch body;

providing a circular counterbore on said second end of said torch end cap adjacent to a side wall of said nozzle;

surrounding said portion of said nozzle extending from said torch end cap with a shield, said shield being disposed on said circular counterbore of said torch end cap;

securing said shield and said nozzle to said torch end cap with a shield retaining cap;

providing a bypass gas flow, said bypass gas flow formed from a portion of said primary gas flow to flow back up over the outside of said nozzle shield and the inside of said shield retaining cap; and directing said bypass gas flow exiting from said torch at an angle aimed at said plasma-arc.

10. The method as recited in claim 9 wherein said step of providing a bypass gas flow comprises the step of providing areas of space at the end of said shield adjacent to said counterbore of said torch end cap.

11. The method as recited in claim 9 wherein said step of surrounding said portion of said nozzle extending from said torch end cap with a shield comprises the step of providing said shield with at least three support feet spaced equidistant from each other, said areas of space being disposed between said support feet.

12. The method as recited in claim 9 wherein said step of surrounding said portion of said nozzle extending from said torch end cap with a shield comprises the step of providing said shield with a plurality of notches around the perimeter of a larger diameter end of said nozzle shield.

13. A method of providing a shield for a plasma-arc torch that pierces and cuts a metallic workpiece producing a splattering of molten metal directed at the torch, said shield protecting a nozzle having a central orifice through which a plasma jet exits toward said workpiece, comprising the steps of:

providing a generally conical sidewall having a truncated end wall generally transverse to said plasma jet exiting said nozzle;

providing an exit orifice in said truncated end wall for aligning with said nozzle central orifice, said exit orifice being sufficiently small whereby said splattering of molten metal strikes said shield without reaching said nozzle; and providing a plurality of paths for a bypass gas to flow back up over said outside wall of said shield with means around a perimeter of an open end of said shield.

14. The method as recited in claim 13 wherein said step of providing a plurality of paths for a bypass gas to flow back up over said outside wall of said shield comprises the step of providing a plurality of notches around said shield perimeter.

15. The method as recited in claim 13 wherein said step of providing a plurality of paths for a bypass gas to flow back up over said outside wall of said shield comprises the step of providing at least three support feet spaced equidistant from each other to provide areas of space between said support feet.

* * * * *